United States Patent [19]
Cummings et al.

[11] Patent Number: 5,862,177
[45] Date of Patent: Jan. 19, 1999

[54] METHOD FOR TESTING COMMUNICATIONS CHANNELS

[75] Inventors: David A. Cummings, Cumming, Ga.; Erik M. Hall, Orlando, Fla.

[73] Assignee: The United States of America as represented by the Secretary of the Army, Washington, D.C.

[21] Appl. No.: 709,795

[22] Filed: Sep. 9, 1996

[51] Int. Cl.⁶ .................................................. G06F 11/00
[52] U.S. Cl. .................. 375/224; 371/68.2; 371/22.4; 371/20.1; 395/183.17
[58] Field of Search .................. 375/224; 371/20.1, 371/20.4, 68.2, 71, 67.1; 364/480, 481; 395/183.17, 183.11; 455/674, 115, 67.1; 342/352

[56] References Cited

U.S. PATENT DOCUMENTS

| | | | |
|---|---|---|---|
| 3,596,245 | 7/1971 | Finnie | 371/5.4 |
| 4,358,848 | 11/1982 | Patel | 371/39 |
| 4,428,076 | 1/1984 | Schuon | 371/5.1 |
| 4,498,716 | 2/1985 | Ward | 371/20.1 |
| 4,591,999 | 5/1986 | Kuroda et al. | 348/415 |
| 4,689,671 | 8/1987 | Ohki et al. | 348/416 |
| 4,890,333 | 12/1989 | Delahaye et al. | 371/20.4 |
| 4,920,537 | 4/1990 | Darling et al | 371/5.1 |
| 5,099,480 | 3/1992 | Murata | 371/20.4 |
| 5,349,578 | 9/1994 | Tatsuki et al. | 371/20.4 |

*Primary Examiner*—Chi H. Pham
*Assistant Examiner*—Emmanuel Bayard
*Attorney, Agent, or Firm*—Michael Zelenka; John M. O'Meara

[57] ABSTRACT

A method for testing communication channels of a satellite using a 16-bit run-length compression algorithm wherein the most significant bit (MSB) is used to represent the errored or not errored condition of the compression algorithm. Error patterns are read and downloaded into a PC interface card which decompresses the file real time and passes the error pattern to a bit error rate summer board. The bit rate summer board overlays the error pattern onto the communication links of the satellite which causes precise bits to be errored accordingly.

5 Claims, 3 Drawing Sheets

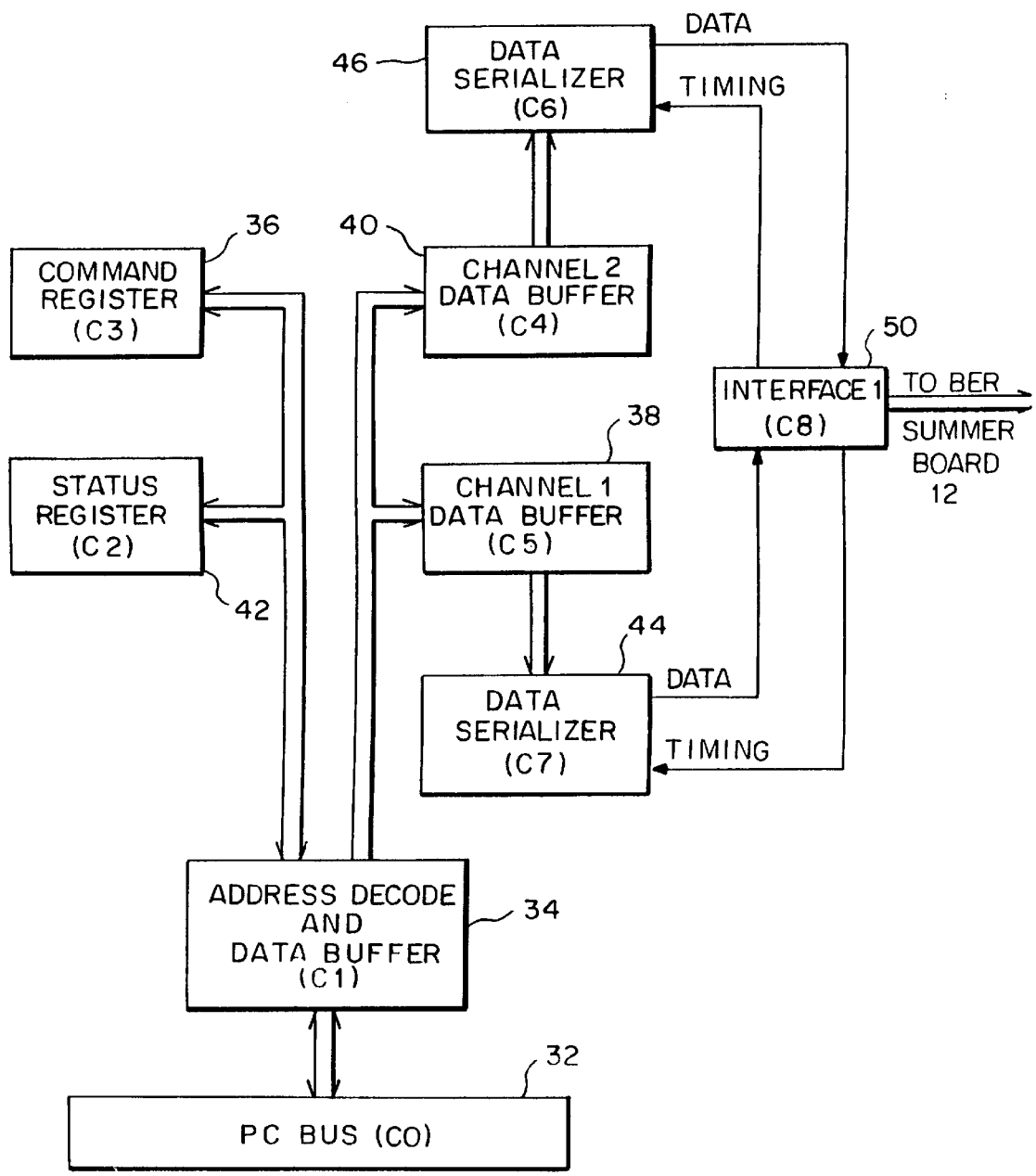

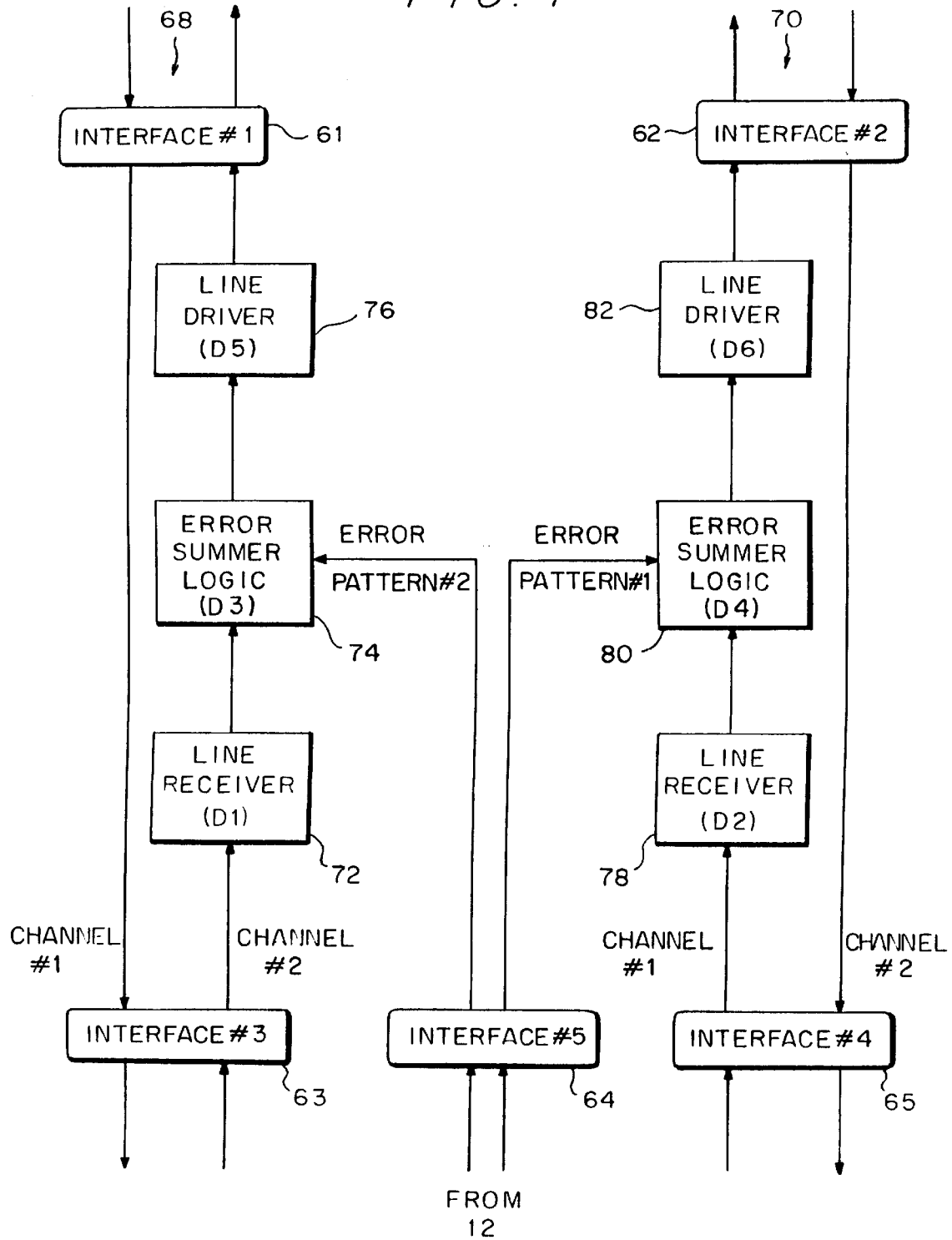

METHOD FOR TESTING COMMUNICATIONS CHANNELS

GOVERNMENT INTEREST

The invention described herein may be manufactured, used, and licensed by or for the Government for governmental purposes without the payment to us of any royalty thereon.

FIELD OF THE INVENTION

The present invention relates to a method of testing communications channels. More particularly, the present invention relates to a method for testing communications channels utilizing a bit error rate (BER) summary unit.

BACKGROUND OF THE INVENTION

There exists test systems which allow systems engineers to inject bit errors into communications systems in order to analyze the effect of error on the communications system. The currently available devices assume that the communications channel has at least one of two types of error distribution. The first assumption is that the channel has a gaussian distribution of errors. This first assumption allows the devices to inject random errors of which the average error rate will center around a programmable value, e.g., $1 \times 10^{-6}$. The second assumption is that the channel errors are of a bursty nature. In accordance with the second assumption, devices for testing cause bursts of error with each error typically having a gaussian distribution at various intervals. For example, the device may be programmed to cause burst errors at a user defined rate (burst density) for a user defined interval (burst length) with a user defined interval of none errors (burst gap).

In certain military satellites, there is a requirement to test communication links with error patterns which are not gaussian and do not fall within the bursty assumptions applied to existing devices. These requirements are also of use with commercial satellites and terrestrial RF communications devices.

In both military and commercial satellites, the communications systems thereof must be modeled, simulated and tested before deployment. Each communication system has various inherent environmental conditions which fall into a gaussian or bursty nature and can be detected utilizing existing devices; however, many situations are arising which do not fall into either of these two categories and can only be tested accurately by injecting precise error patterns generated from computer simulations. Computer simulations may reflect BER patterns which arise in civilian applications from antennae design, collocation of antennas and noisy environments in civilian satellites. In military satellites, unique error patterns arise from the same sources as in civilian applications but also include jamming as well as friendly interference.

SUMMARY OF THE INVENTION

In view of the aforementioned considerations, it is an object of the present invention to enable testing of communications systems for unique errors other than those having a gaussian distribution or having a bursty nature.

In view of this object and other objects, the present invention enables the generation of any possible error pattern by allowing the user to generate error pattern source files using a specific run-length algorithm which depicts every bit, either errored or non-errored in the error pattern.

The error pattern files are read and downloaded into a PC interface card which decompresses the file real time and passes the error pattern to a bit error rate summer board. The bit error rate summer board overlays the error pattern onto the communication links which causes precise bits to be errored accordingly. In accordance with a method of the present invention, the error data in compressed form is configured as a 16-bit, run-length encoded format having a most significant bit, wherein the most significant bit indicates the error condition of the bit. Moreover, bits other than the most significant bit represent a binary count value indicating the quantity of consecutive bits to undergo the condition represented by the most significant bit. The least significant bit of the 16-bit word is also the least significant bit of the count. A computer reads the compressed algorithms and writes the compressed data to a PC interface.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 3 is a diagram of an interface board configured in accordance with the principles of the present invention; and FIG. 4 is a diagram illustrating the operation of a summer board in accordance with the principles of the present invention.

DETAILED DESCRIPTION

Figure 1:
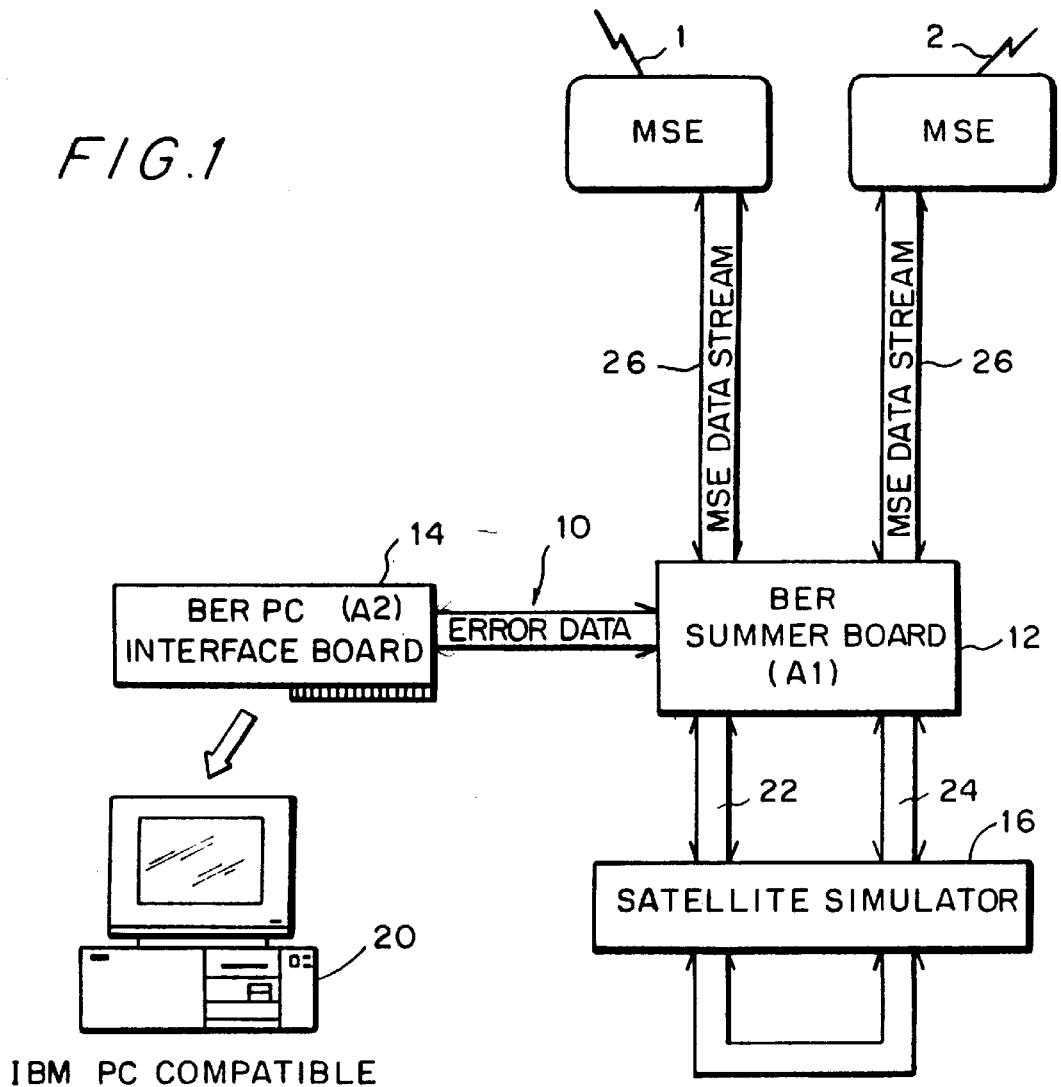
FIG. 1 is a diagrammatical view of a bit error summary unit configured in accordance with the principles of the present invention.

Referring now to FIG. 1, there is shown a summer unit 10 configured in accordance with the principles of the present invention. The summer unit 10 is comprised of a bit error rate (BER) summer board 12 and a PC interface board 14. The summer unit 10 inserts into a communications channel of a satellite simulator 16 redefined error patterns MSE 1 and MSE 2, which error patterns emulate environmental characteristics such as interference.

The BER summer board 12 interfaces the communications link 26 to convert link interference signals 22 and 24 which have been balanced NRZ for Mill-Std-188 to TTL signal levels so that the digital equipment can process the interference signals. In the BER summer board 12, the error pattern is summed with channel data and converted to proper signal channels at the channel interface. The PC interface board 14 receives compressed error data from a PC 20, decodes the data real-time and passes the error pattern to the BER summer board 12 for insertion into the channel data stream.

The BER summer unit 10 of FIG. 1 is capable of injecting a simplex error pattern into channels 22 and 24 of the communications link, either individually or simultaneously so that both the transmit channel and the receive channel carry the same or different error pattern.

Figure 2:
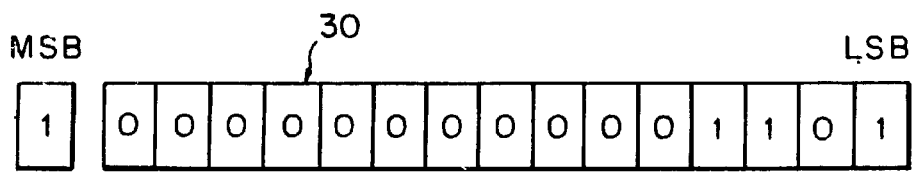
FIG. 2 is a diagram illustrating a compression algorithm utilized to practice the present invention.

Referring now to FIG. 2, each error pattern is stored as a compressed computer file which is typically the output from a computer simulation in the form of a compression algorithm 30. The data in the compression algorithm 30 is stored as a 16-bit run-length encoded format. In this format, the most significant bit (MSB) is the condition bit which represents the state of a bit or several consecutive bits in the communications channel. A "0" or "off-condition" indicates that the bit or bits should not be in error. A "1" or "on-condition" indicates that the bit or bits should be in error. In the illustration of FIG. 2, the remaining 15 bits represent a binary count value indicating the quantity of consecutive bits to undergo the "off" or "on" condition represented by the most significant bit (MSB). The least significant bit (LSB) of the 16-bit word is also the least significant bit of the count. In accordance with the invention, the computer 20 reads the error pattern files containing compression algorithms 30 and writes the compressed data streams to the bit error rate PC interface board 14.

Referring now to FIG. 3 where the PC interface board 14 is shown in greater detail, it is seen that the PC interface board contains the circuitry to control the operation of the bit error rate summer board 12 (see FIG. 1). In addition, the PC interface board 14 buffers the data from the PC bus 32 with a buffer 34 and converts the data to a serial format which is required for operation of the BER summer board 12. The PC bus 32 is part of the IBM-compatible computer 20 and is necessary to host the interface board 14 of the FIG. 3.

Access to the interface board 14 by the host PC 20 is controlled by the buffer 34 which performs address decode and data buffer functions. The buffer 34 controls whether the data being written to the interface board 14 is routed to a command register 36 or one of two channel data buffers 38 or 40. If the data is being read from the interface board 14, the address decoder circuit in the buffer 34 controls whether it is the content of a status register 42 or the content of the command register 36 which are forwarded onto the PC bus 32. Status register 42 is an 8-bit register having bits which reflect the empty, full and half-full states of each channel's data buffer 34. By monitoring the status register 42, the host PC 20 can tell when it is necessary to feed more data into the channel buffers 38 and 40. In addition, by monitoring the status register 42, the PC can tell when the buffers 38 and 40 are empty so as to terminate a test.

The command register 36 is like the status register 42 and 8-bit register, but it is used to control the functions of the interface board 14 and the bit error summer board 12. The bits in the command register 36 enable or disable the channel data buffers 38 and 40, reset the buffers and enable or disable the ability of the interface board 14 to interrupt the host PC 20. Moreover, the bits in the command register 36 either enable or disable the functioning of the bit error rate summer board 12. The functions of the command register 36 are the same for the channel 1 data buffer and the channel 2 data buffer control.

Preferably, the channel 1 and channel 2 data buffers are each 16-bit, 8,192-word, "first in-first out" buffers. It is necessary to employ these buffers due to the speed difference between the PC bus 32 and the variable rate data streams flowing through the bit error rate summer board 12.

Associated with the first channel data buffer 38 is a data serializer 44 and associated with the second channel data buffer 40 is a data serializer 46. The data serializers 44 and 46 take compressed data from the channel data buffers 38 and 40 and perform a decompression of the run-length encoded data 30 of FIG. 2. This decompressed data is forwarded out of an interface 50 to the BER summer board 12 at a clock rate supplied by the BER summer board. Preferably, the data serializers 44 and 46 are located on daughter boards mounted onto the interface board 14. This allows for different data serializers 44 and 46 to be developed for different compression needs and standards.

Referring now to FIG. 4 where functional blocks and interfaces of the bit error rate summer board 12 are shown, it is seen that there are five interfaces, 61, 62, 63, 64, and 65 to the summer board. Interfaces 61 and 62 provide a standard interface to both the transmit and receive nodes. Standard interfaces are exemplified by Mil-Std-188, RS-449 or V.35. The interfaces 63 and 65 provide an additional standard interface for the use of additional test devices in the communications link. The additional test devices can be delay generators or can be connected together directly if additional test devices are not required in the link. The interface 64 provides a cable connection to the PC 20 (FIG. 1) so that the error patterns from the PC interface board 14 are received and also provide channel timing to the PC interface board 12.

For each channel, the bit error rate summer board 12 has two identical circuits 68 and 70. The circuit 68 performs three functions, for the second channel 40, i.e., the line receiver function 72, the error summer function 74 and a line driver function 76. For the first channel 38, the circuit 70 has a line receiver function 78, an error summer function 80 and a line driver function 82. The line receiver functions 72 and 78 receive and terminate the line level signals from their respective interfaces and convert the signals to TTL-compatible signals for use in the error summer logic functions 74 and 80 of the bit error rate summer board 12.

Each bit error rate summer function 74 and 80 sums the incoming data stream from its respective line receiver function 72 or 78 as well as the error pattern from the PC interface board 14 which enters through the interface 64. The summing function is logically an "XOR" ing of the two data streams from PC interface board 12 and the line receivers 72 and 78 connected to the channels 38 and 40. If the incoming error pattern bit is in an "off-condition" the channel data bit is unchanged, i.e., non-errored and, if the incoming pattern is in an "on-condition" the channel data bit is inverted, i.e., errored. The output bit of the bit error rate summer function provides input to the line driver functions 76 and 82. The line driver functions provide a conversion from the TTL-compatible signals used in the bit error rate summer function back to line level signals.

By utilizing the aforedescribed arrangement, any possible error pattern may be generated by allowing the user to generate error pattern source files using the specific run-length algorithm 30 of FIG. 2 which depicts every bit, both errored and non-errored in the error pattern. The error summer logic of the bit error rate summer board overlays the error pattern of FIG. 2 onto the communications links causing precise bits to be errored accordingly.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for testing digital communications channels, comprising:
   generating and storing source files of bit error patterns that have a unique nature relative to bit error patterns of a gaussian or bursty nature;
   passing the error patterns through an interface to a bit summer; and
   evaluating each communications channel by overlaying one of the unique error patterns thereon with the bit summer to derive an error pattern comparison for that channel.

2. The method of claim 1 wherein the step of generating and storing source files of bit error patterns is accomplished with a computer.

3. The method of claim 1 wherein the interface performs the following steps:

buffering the flow of error patterns into the interface;

monitoring the flow of error patterns into the bit summer with a status register; and controlling the buffering and monitoring steps with a command register.

4. The method of claim 3 wherein the interface also performs the following steps:

buffering the flow of error patterns from the interface to the bit summer; and converting such flow to a serial format.

5. The method of claim 1 wherein the bit summer performs the following steps:

separately receiving the signal of each communications channel and the bit error pattern to be overlayed thereon;

separately overlaying the signal of each communications channel with the bit error pattern relating thereto.

* * * * *